United States Patent [19]

Slavin

[11] Patent Number: 4,740,841

[45] Date of Patent: Apr. 26, 1988

[54] CORRELATION OF VIDEO DATA BETWEEN TWO DISPLAY FORMATS

[75] Inventor: Keith R. Slavin, Aloha, Oreg.

[73] Assignee: Tektronix, Inc., Beaverton, Oreg.

[21] Appl. No.: 30,753

[22] Filed: Mar. 24, 1987

[51] Int. Cl.⁴ .............................................. H04N 17/00
[52] U.S. Cl. ...................................... 358/139; 358/10
[58] Field of Search .................. 358/139, 10, 181, 183

[56] References Cited

U.S. PATENT DOCUMENTS

| | | | |
|---|---|---|---|
| 3,330,907 | 7/1967 | Arimura | 358/139 |
| 3,337,684 | 8/1967 | Sadler | 358/139 |
| 3,423,525 | 1/1969 | Baun | 358/139 |
| 3,435,136 | 3/1969 | Bachmann | 358/139 |
| 3,534,163 | 10/1970 | Rao | 358/139 |
| 3,798,366 | 3/1974 | Hunt | 358/113 |
| 3,989,891 | 11/1976 | Freestone | 358/139 |
| 4,677,481 | 6/1987 | Nicholas | 358/139 |

Primary Examiner—Howard W. Britton
Attorney, Agent, or Firm—Francis I. Gray

[57] ABSTRACT

A method for correlating video data between two video display formats uses a multi-function instrument which digitizes the input video data. An operator selects a horizontal line of the video data via a rotary encoder which updates a global variable common to all display formats. Subsequent selection of a different display format results in the same horizontal line of the video data being displayed in the new display format.

2 Claims, 3 Drawing Sheets

CORRELATION OF VIDEO DATA BETWEEN TWO DISPLAY FORMATS

BACKGROUND OF THE INVENTION

The present invention relates to the analysis of video signals, and more particularly to a method for correlating video data between two display formats so that an operator can readily analyze the same video data in different formats.

Presently video signals, such as television signals that have a repetitive line format, are analyzed by a multiplicity of analog test instruments, such as waveform monitors, vectorscopes, spectrum analyzers, picture monitors and the like. Recently with the advent of digital oscilloscopes the video signals may be processed and displayed digitally as waveforms. In either event the ability to correlate what is observed on one instrument to the same video data displayed on another instrument requires operator set up of each instrument to observe the same information, i.e., the same horizontal video line for television signals.

What is desired is a means for readily switching between different video display formats to observe the same video data in different display modes without requiring the operator to set up the instrument for each format.

SUMMARY OF THE INVENTION

Accordingly the present invention provides a method for correlating video data between two video display formats by using a multi-format instrument having input video data which is digitized for processing. For a television video input signal an operator selects a horizontal line of video data within a complete picture frame by rotating a rotary encoder. The selection of the horizontal line serves as a common global variable for the video data. The operator may then select any display function and the resulting display corresponds to the selected horizontal line of data as identified by the common global variable.

The objects, advantages and novel features of the present invention will be apparent from the following detailed description when read in conjunction with the appended claims and attached drawing.

DESCRIPTION OF THE PREFERRED EMBODIMENT

Figure 1:
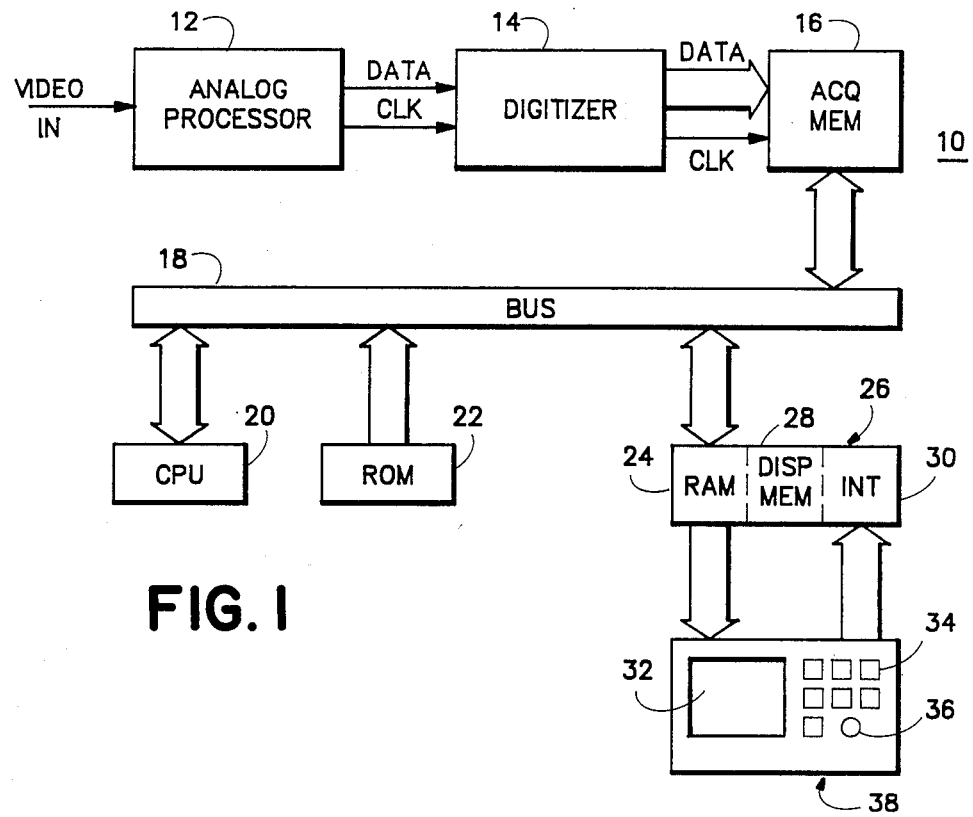
FIG. 1 is a general block diagram of a multi-format instrument using the present invention.
Figure 2:
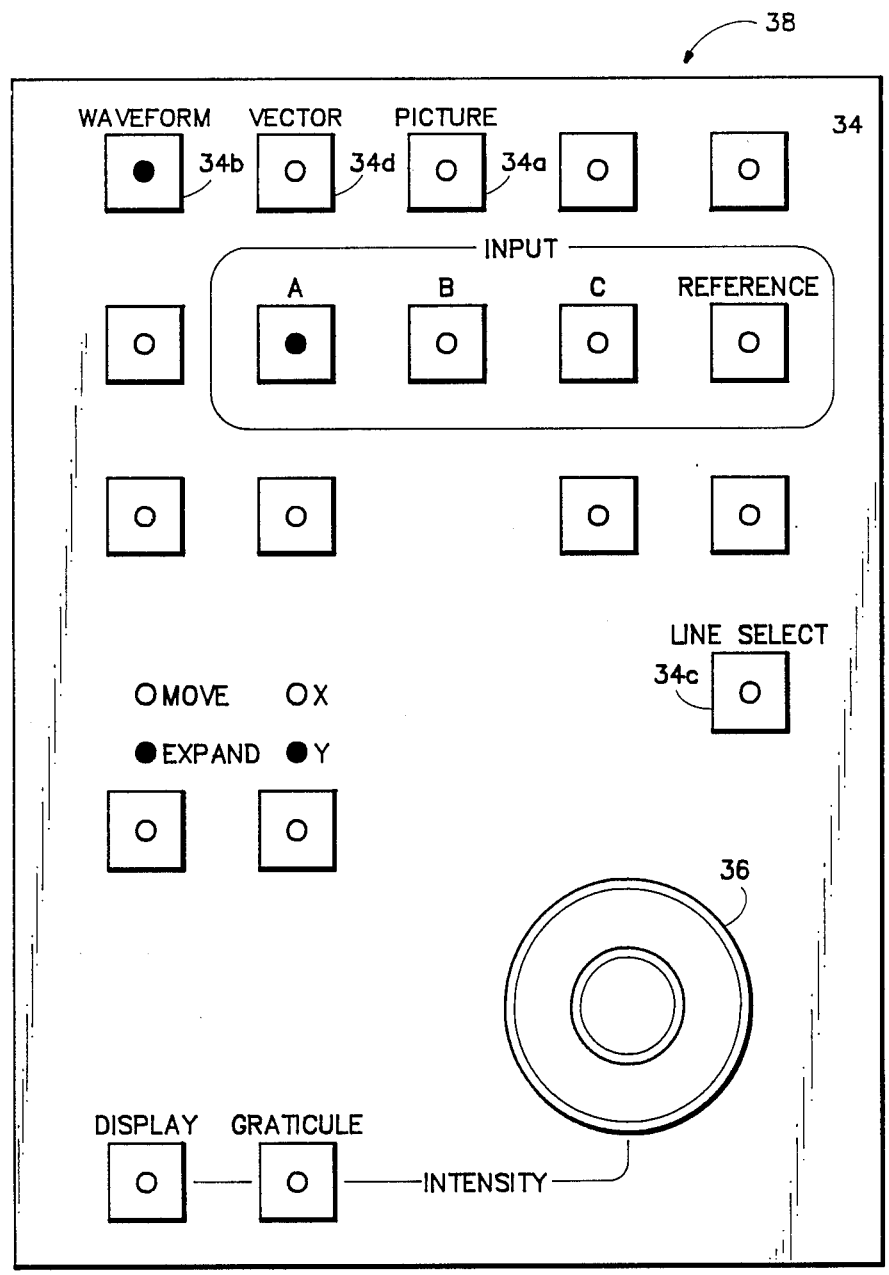
FIG. 2 is a front plan view of a front panel for the multi-format instrument of FIG. 1.

Referring now to FIGS. 1 and 2 a multi-format instrument 10 is shown having an input video signal, such as a television signal. The video signal is conventionally processed in the analog domain by an analog processor 12, digitized by a digitizer 14 and input to an acquisition memory 16. The acquisition memory 16 is connected to a communications bus 18 to which also are connected a central processing unit (CPU) 20 with associated ROM 22 and RAM 24, and a display interface unit 26. The display interface unit 26 includes the CPU RAM 24, a display memory 28 and an interface circuit 30. The contents of the display memory 28 are displayed on a screen 32. The digitized video data from the acquisition memory 16 is processed by the CPU 20 according to functions and parameters input by an operator via function buttons 34 and a rotary encoder knob 36, and via interaction with the screen 32. The processed data is stored in the display memory 28 together with appropriate scales, cursors and display information. Some of the display functions which may be selected are a waveform monitor mode, WAVEFORM, a vectorscope mode, VECTOR, or a picture mode, PICTURE. The selection of a particular portion of the video data displayed in any of the display functions may be performed by entering a line select mode, LINE SELECT, and rotating the rotary encoder 36 to increment, or decrement according to the direction of rotation, the horizontal line of video data to be displayed. If the rotary encoder 36 has approximately two hundred increments per revolution, any horizontal line may be selected within approximately three revolutions of the rotary encoder since the current television standards use 525 or 625 lines per picture frame. Selection of the horizontal line number provides a global variable for use by the CPU 20 in whatever display function mode is selected.

Figure 3:
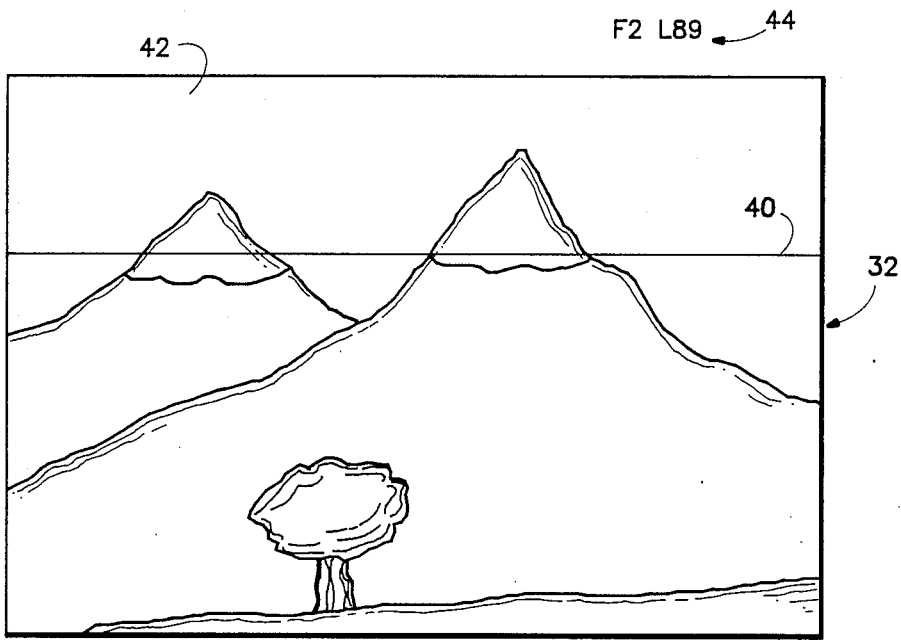
FIG. 3 is a plan view of one display format of the multi-format instrument illustrating the use of the present invention.
Figure 4:
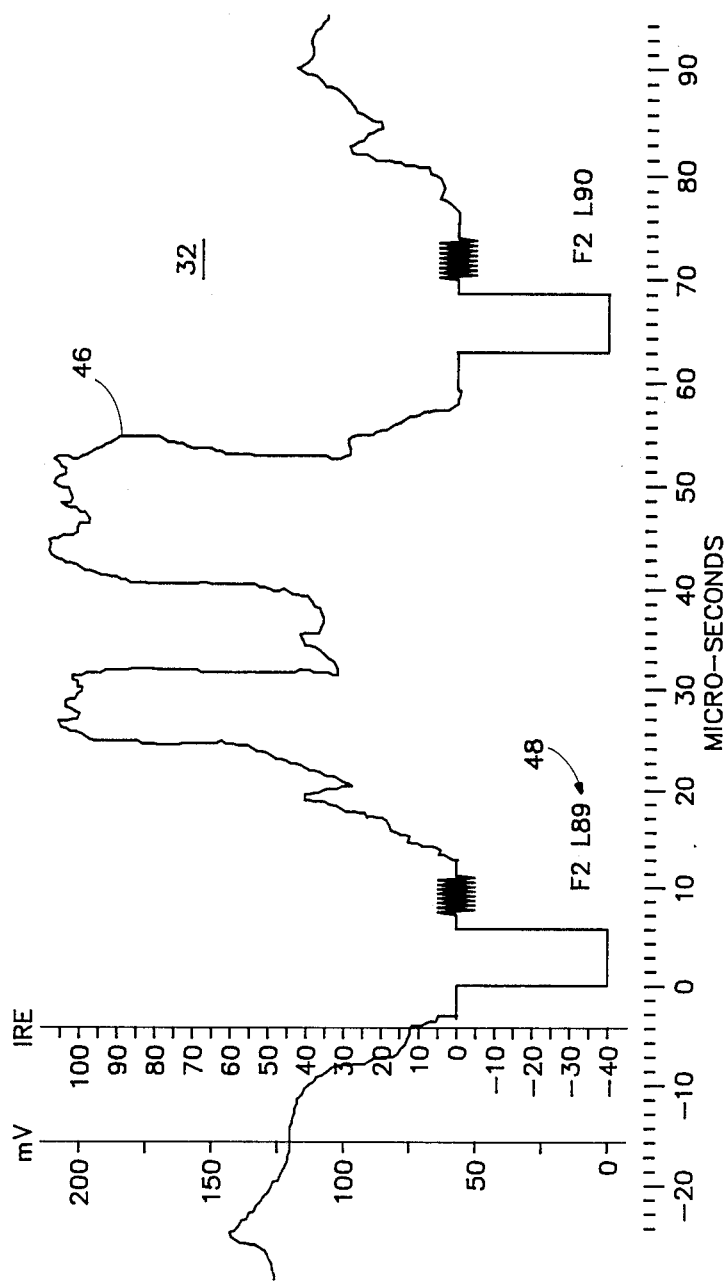
FIG. 4 is a plan view of another display format of the multi-format instrument illustrating the correlation of the video data between display formats.

In operation the operator selects a display function, such as the picture mode function shown in FIG. 3 selected by the PICTURE button 34a on the front panel 38. In the picture mode the CPU 20 updates the display memory 28 on a periodic basis by converting each sample for a complete field of the picture frame from the acquisition memory 16 into corresponding luminance values ranging from White to black. These luminance values are then loaded for display into the display memory 28. A cursor 40 is displayed horizontally across the displayed picture 42 at a position determined by the global variable by performing an exclusive OR function with the video data for that line. In this display function the CPU 20 treats the rotary encoder 36 as if the LINE SELECT button 34c is activated so that by rotating the rotary encoder the cursor 40 is moved vertically across the picture 42. Since only one field of the picture frame is displayed, when the line number exceeds the number of lines for that field, i.e., rolls off the top or bottom of the displayed picture 42, the field number is incremented. Movement of the rotary encoder 36 serves to increment or decrement the line number as shown on the screen 32 in the form of a field/line number 44 as well as moving the cursor 40 line by line accordingly. When the cursor 40 overlies the desired line of the picture 42, as indicated visually or by the displayed line number 44, the operator activates another function button 34b such as WAVEFORM, to show that line of video data in another display format. A shown in FIG. 4 if the waveform monitor mode is selected, then the portion 46 of the video waveform displayed includes that portion of the video input signal corresponding to the line number selected in the PICTURE mode. In this manner the displayed horizontal cursor 40 in the picture mode is linked to the displayed waveform line. The line number 48 in the waveform mode may be selected also by activating the LINE SELECT button 34c and rotating the rotary encoder 36. The waveform 46 will change to reflect the changing line numbers and, when the PICTURE button 34a is activated, the horizontal cursor 40 across the picture 42 will be at the selected line number. Likewise selection of the vectorscope mode by activating the VECTOR button 34d results in the selected horizontal line being displayed in a conventional vectorscope format.

By using a touch screen for the display screen 32 all of the button functions can be simulated via "soft keys" on the screen, as is well known to those of ordinary skill in the art.

Thus the present invention provides a method for correlating video data in one display format with video data in another display format on a multi-format instrument by using a rotary encoder to vary a global variable which is used by all the display functions of the instrument.

What is claimed is:

1. A method for correlating video data having a standard television format between different display functions of a multi-function instrument comprising the steps of:
  selecting in a first display function a line number corresponding to the video data to be correlated, the line number being a global variable common to all display functions; and
  selecting a second display function, the video data displayed by the second display function being that determined by the global variable.

2. A method as recited in claim 1 wherein the step of selecting the line number comprises:
  activating a line select function; and
  rotating a rotary encoder, rotation of the rotary encoder serving to increment or decrement the line number according to the direction of rotation.

* * * * *